United States Patent
Wallace

(12) 
(10) Patent No.: US 6,366,829 B1
(45) Date of Patent: Apr. 2, 2002

(54) BULK INVENTORY NETWORK SYSTEM (BINS)

(75) Inventor: David B. Wallace, Mechanicsburg, PA (US)

(73) Assignee: J. P. Donmoyer, Inc., Ono, PA (US)

(*) Notice: Subject to any disclaimer, the term of this patent is extended or adjusted under 35 U.S.C. 154(b) by 0 days.

(21) Appl. No.: 09/167,379

(22) Filed: Oct. 6, 1998

(51) Int. Cl.⁷ .......................... G06F 17/00; G06F 17/60
(52) U.S. Cl. ........................ 700/236; 705/22; 705/28
(58) Field of Search .................. 700/95, 236, 226; 705/22, 16, 28; 340/988, 990; 701/202, 300; 713/320; 222/1

(56) References Cited

U.S. PATENT DOCUMENTS

| | | | |
|---|---|---|---|
| 4,563,739 A | 1/1986 | Gerpheide et al. ........... 364/403 |
| 4,636,950 A * | 1/1987 | Caswell et al. .............. 705/28 |
| 4,866,255 A | 9/1989 | Sing ............................ 235/385 |
| 4,961,533 A | 10/1990 | Teller et al. ............. 177/25.19 |
| 5,056,017 A | 10/1991 | McGarvey .................. 364/403 |
| 5,154,314 A * | 10/1992 | Van Wormer .................. 222/1 |
| 5,319,544 A * | 6/1994 | Schmerer et al. ............. 705/28 |
| 5,334,822 A | 8/1994 | Sanford ....................... 235/385 |
| 5,347,274 A * | 9/1994 | Hassett ....................... 340/988 |
| 5,406,297 A * | 4/1995 | Caswell et al. ............. 343/741 |
| 5,533,079 A * | 7/1996 | Colburn et al. ................. 377/6 |
| 5,644,725 A * | 7/1997 | Schmerer ...................... 705/28 |
| 5,671,362 A | 9/1997 | Cowe et al. ................. 395/228 |
| 5,712,789 A * | 1/1998 | Radican ....................... 700/226 |
| 5,712,989 A | 1/1998 | Johnson et al. ............. 395/228 |
| 5,727,164 A | 3/1998 | Kaye et al. .................. 395/228 |
| 5,887,176 A * | 3/1999 | Griffith et al. .............. 713/320 |
| 5,929,770 A * | 7/1999 | Faita ...................... 340/825.35 |
| 5,983,198 A * | 11/1999 | Mowery et al. ............... 705/22 |
| 6,148,291 A * | 11/2000 | Radican ........................ 705/28 |
| 6,181,981 B1 * | 1/2001 | Varga et al. ................. 700/236 |

* cited by examiner

Primary Examiner—Kevin J. Teska
Assistant Examiner—Ronald D. Hartman, Jr.
(74) Attorney, Agent, or Firm—Duane Morris LLP

(57) ABSTRACT

A system and method for remote monitoring of material storage levels for dry bulk goods, wherein an independent entity, such as a transportation carrier, can continuously monitor raw material supply levels at a remote manufacturing plant, and, based on projected usage rates, place timely orders on behalf of the plant, with preselected vendors, to replenish depleted raw materials. The transportation carrier can then coordinate material shipments from the vendor to the manufacturing site using its own trucks. In this manner, the task of maintaining sufficient on site raw material storage levels is completely removed from the manufacturing plant.

16 Claims, 1 Drawing Sheet

BULK INVENTORY NETWORK SYSTEM (BINS)

BACKGROUND OF THE INVENTION

1. Field of the Invention

The invention relates to the field of automated inventory management, and in particular concerns a system for remote monitoring of material storage levels for dry bulk goods, wherein an independent entity, such as a transportation carrier, can continuously monitor raw material supply levels at a remote manufacturing plant, and, based on projected usage rates, place timely orders on behalf of the plant, with preselected vendors, to replenish depleted raw materials. The transportation carrier can then coordinate material shipments from the vendor to the manufacturing site using its own trucks. In this manner, the task of maintaining sufficient on site raw material storage levels is completely removed from the manufacturing plant.

2. Prior Art

Manufacturers frequently employ independent transportation carriers to deliver raw materials from vendor cites to manufacturing sites on an as-needed basis. Traditionally, manufacturers themselves monitor on-site inventory levels and product usage rates, and, when material supplies become low, a phone call is placed from the plant site to an outside vendor to order another shipment of raw materials. Typically, a transportation carrier is separately contracted with to pick up the raw material order from the vendor site and deliver the shipment to the manufacturer.

Raw material inventories must be continuously monitored and raw material orders and shipments must be carefully coordinated to ensure a sufficient amount materials are always at hand. If material supplies are exhausted before new material shipments can be delivered, manufacturers may be forced to temporarily shut down manufacturing operations, resulting in lost production time and revenues.

When several raw materials are simultaneously used in product manufacturing, the task of monitoring material levels becomes increasingly difficult. An additional challenge is presented when the usage rate for each of these materials fluctuates over time.

In the case of dry bulk goods such as lime, coal and ash, for example, specially adapted trucks and trailers are often required to transporting the materials from a vendor to a plant site. In order to ensure the availability of a transport carrier when a material shipment is needed, it is desirable to schedule shipments as far in advance as possible. Thus, the ability to monitor existing material levels as well as to project future material requirements is critical. Likewise, the ability to quickly convey this information to a transport carrier is essential.

Several automated systems have been designed to facilitate the management of material inventories. For example, U.S. Pat. 5,727,164—Kaye et al. discloses an inventory management system wherein a centralized inventory database can be remotely accessed to retrieve information. U.S. Pat. 5,761,362—Cowe et al. discloses an inventory monitoring system wherein electronic shelf units automatically monitor product inventory levels. Each of these systems allow remote access to a centralized database to monitor inventory levels.

While these systems enable material stores to be remotely monitored, they are not useful for monitoring dry bulk goods nor do they provide means to interpret usage trends or project usage rates based on archived data.

What is needed is an automated system capable of continuously monitoring material levels for dry bulk goods as well as projecting future usage rates for materials based on archived data. Preferably, the system would provide for the automated transmittal of data to a remote site at predetermined time intervals.

SUMMARY OF THE INVENTION

In one aspect of the invention a remote material monitoring system is provided which can be used to monitor inventory quantities for raw materials at a remote site and automatically transmit signals corresponding to existing material levels from the remote site to a central computer at predetermined time intervals.

In another aspect of the invention a remote material monitoring system is provided which includes a central computer having software means capable determining material levels and projecting material usage rates based on signals transmitted from a remote material storage site.

In another aspect of the invention a remote materials monitoring system is provided in which the central computer includes software means for displaying the material levels and projected usage levels in tablature and graphical form.

In yet another aspect of the invention the central computer includes software means for sounding visual and/or audible alarms if the material levels being monitored fall below predetermined levels.

In yet another aspect of the invention a method is provided for continuously monitoring material levels in a storage vessel at a remote site without human intervention.

In another aspect of the invention a method is provided for a transportation carrier to maintain sufficient raw material quantities at a remote manufacturing plant site.

These and other aspects are provided in a system for monitoring a material quantity at a remote manufacturing site. The system comprises a detector for producing a first output signal corresponding to an existing material quantity. A remote telemetry unit receives the first output signal from the detector and produces a corresponding second output signal. A central computer is coupled to the remote telemetry unit for receiving the second ouput signal which is automatically transmitted to a central computer at predetermined time intervals. The central computer includes software means for determining the quantity of said existing material at the remote site as well as projected usage rates for said existing material based on the transmitted signals.

In a preferred embodiment of the invention the detector comprises an ultrasonic or strain gauge detector and the remote unit and central computer are coupled via modem for transferring the output signals from the remote unit to central computer.

A method for a transportation carrier to maintain sufficient quantities of raw materials at a remote manufacturing site is also contemplated and comprises the steps of: generating a first signal relative to an existing raw material quantity at a remote site using a detection device; automatically transmitting a second signal corresponding to said first signal, from said remote site to a central computer at predetermined time intervals; determining said existing raw material quantity and projected material usage rate for said existing raw material quantity based on said transmitted signals; ordering additional raw material from a preselected vendor based on said existing material quantity and said projected material usage rate; providing a transport vehicle to deliver said additional raw material from said preselected vendor to said manufacturing site; and transporting said additional raw material from said preselected vendor to said manufacturing site, whereby additional raw material is supplied to said manufacturing site before said existing raw material is depleted.

While the described system and method for monitoring and maintaining remote material stores are applicable for any bulk commodities, they are particularly advantageous for use in connection with the storage of dry bulk goods in storage silos or similar structures.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
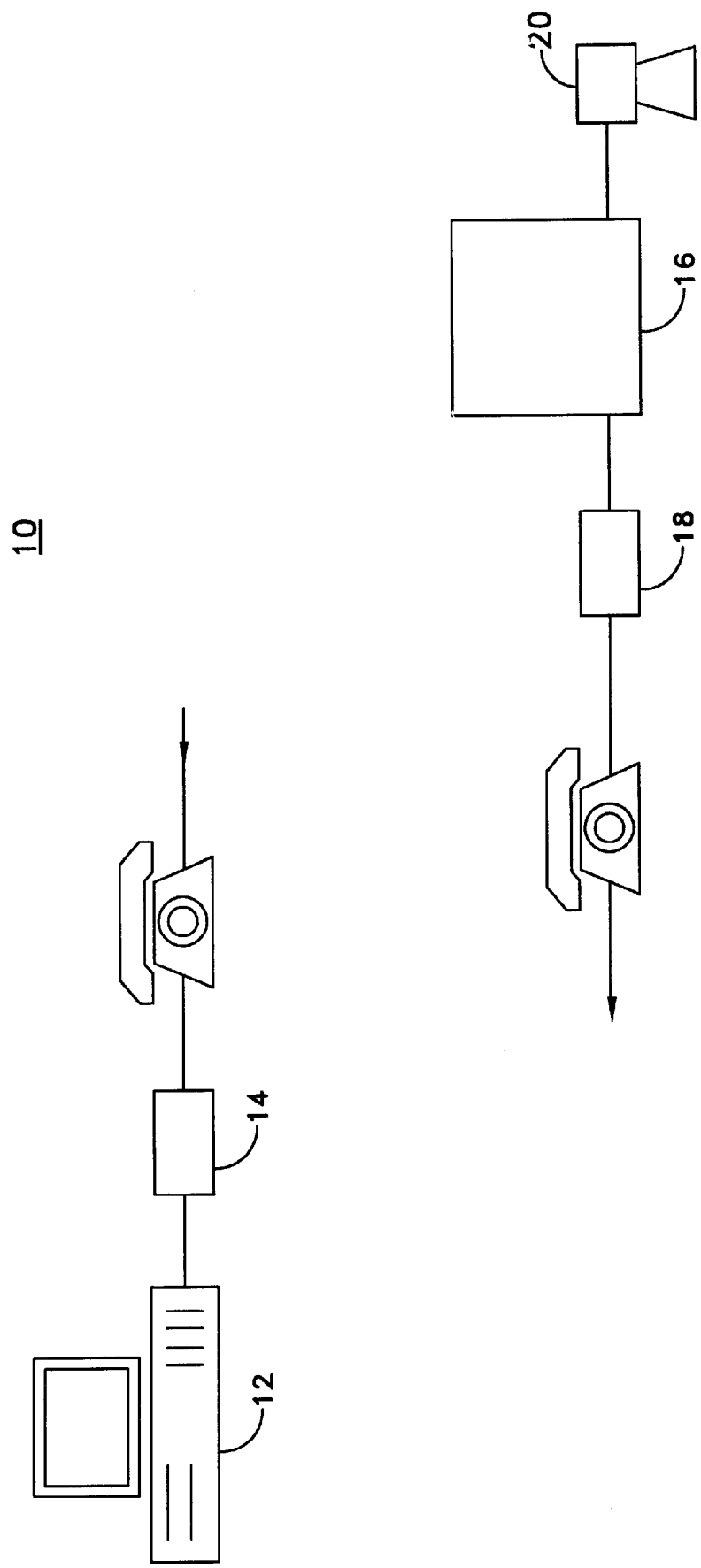
FIG. 1 is block diagram of a remote inventory monitoring system according to the invention.

The invention concerns a Bulk Inventory Network System (BINS) used to monitor customer inventories and order delivery of dry bulk materials. The BINS system depends on transmission of data from remote customer sites to a centrally located computer. Information, transferred by telephone communications, consists of the level or weight of material in storage at the customer's business. When a trigger level or minimum volume of material is reached, dispatchers are notified that a shipment of dry bulk materials should be delivered to the customer's site. Customer storage records are also monitored by the BINS central computer, displayed on a trend graph, and stored as a historical record of dry bulk material usage by the customer.

Referring to FIG. 1, a block diagram of a remote inventory monitoring system 10 is shown according to the invention. The preferred system comprises a central computer 12 and a first modem 14, which are distant from the dry bulk material storage vessel being monitored. The remote telemetry unit (RTU) 16, a second modem 18 and a level detector 20 are disposed at the storage vessel site. Typically, the level detector is positioned directly on the storage vessel. Software means are installed and continuously running on the central computer. The software means receive and store data transmitted from the RTUs at each storage vessel in the system. The software means also determine existing material levels and quantities as well as projected usage rates for each material based on the transmitted data. In addition, the software means are programmed to activate a visual and/or audible alarm (i.e., flashing icon and/or beep) as well as to display the information on a trend graph for easy viewing.

Two alternative means are used to control and operate the system. A first preferred means is used in connection with a remotely controlled system. The remotely controlled system utilizes a microprocessor based RTU that is programmed to receive a first output signal from the level detector, produce a second output signal corresponding to said first output signal, place a telephone call to the central computer and transfer data to the computer. In this system, each RTU controls data collection and transmission, and therefore, requires relatively sophisticated programming. The RTUs are often configured using a laptop computer connected directly to a port in the RTU at the storage site. Under the remote control concept, the central computer acts primarily as a data storage and display device. Standard personal computers may be utilized for this portion of the system. In this system, changes to system operations, such as time intervals between data transmissions, usually require a trip to the storage vessel site for modification of the RTU programming.

In a second preferred embodiment of the invention, a centrally controlled system is utilized comprising a central computer that contacts each remote site and retrieves data directly from the RTU at that site. Site equipment would include a basic RTU configured to receive a first output signal from a level detector, produce a second output signal corresponding to said first ouput signal, and on command, transmit the second output signal to the central computer. System control and programming is concentrated at the central computer in this embodiment. Typically the central computer is a standard personal computer and the RTUs are simplified devices which act primarily as data collection devices and, as a result, require minimal programming.

Preferably, an ultrasonic level detector or a strain gauge level detector is used to measure the contents of the storage vessel. For example, strain gauges can be placed on the legs of the storage tower to measure the change in load on the legs caused by the change in volume of material in the storage vessel. These devices typically produce a signal in the range of four to twenty milliamps, which is proportional to the material volume in the vessel. A preferred ultrasonic level indicator is available from Kistler-Morse. A remote telemetry unit (RTU) receives the four to twenty milllamp analog signals and converts them into corresponding digital signals which can be processed by the central computer. The RTU then places a telephone call, on preset two-hour timed intervals, to transmit the converted signals to the central computer.

It would be understood by those skilled in the art that a RTU may be a stand alone unit comprising well known components for analog/digital signal conversion and which may additionally include means for automatic transmission of data to a central computer via modem at predetermined time intervals, or, alternatively, may comprise a plurality of discrete components such as an analog/digital converter, microprocessor and modem also for providing the function. The inventor also contemplates use of a level detection device having an integrated analog/digital converter and microprocessor which can communicate directly with the central computer.

One RTU that has been found to be particularly useful for use in connection with the present invention is available from Control Microsystems and includes the following components: Model RS-232 Communication Processor; Model 5501-20 8-Channel Analog Input Module; Model 5103 Power Supply Module; and Model ACX24 Transformer. Suitable stand alone RTUs include the Bristol Babcock Models RTU 3301 and RTU 3305, and the Fisher-Rosemount Model ROC 306 Remote Operations Controller.

The central computer receives and stores data transmitted from the RTUs at each customer site. The central computer includes commercially available software used to monitor inventory levels and generate statistical data and trend graphs based on the transmitted data. Two suitable software packages are the Lookout Run-Time and Lookout Development software. Other known software packages include Bristol Babcock's ZxMMI graphics software and Intellution's FIX MMI graphics package.

Advantageously, the aforementioned system can be used by a transportation carrier to maintain sufficient quantities of raw materials at a remote manufacturing site. For example, a manufacturer who wishes to relieve itself from the day-to-day responsibility of monitoring, recording and maintaining sufficient raw material stores can contract with a transportation carrier to provide this service.

In accordance with the invention, the transportation carrier maintains a central computer for receiving and processing data from a manufacturing plant. Signals are generated from one or more storage silos or similar containment structures at the manufacturing plant. The signals are automatically transmitted, via the RTU, to the central computer at predetermined time intervals. Software means generate statistical data in the form of tables and graphs based on the periodic signal inputs. The data include material levels, material usage rates and material usage rate changes, and projected material usage rates. The data is used to plan and schedule shipment of additional material to the plant site in order to replenish depleted stores.

The manufacturer preselects suitable vendors for supplying each raw material. This information is provided to the transportation carrier at the time of contracting. When raw material levels fall below a predetermined acceptable level, the transportation carrier places an order with the appropriate vendor for additional material. The transportation carrier then coordinates the material shipment from the vendor to the manufacturing site using its own trucks.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A system for monitoring a material quantity at a remote site comprising:

a detector for producing a first output signal corresponding to an existing material quantity;

a remote telemetry unit for receiving said first output signal from said detector and producing a second output signal corresponding to said first output signal; and a central computer coupled to said remote telemetry unit for receiving said second output signal from said remote telemetry unit, said central computer including software means for determining said existing material quantity and a projected usage rate for said existing material quantity based on said second output signal.

2. The system of claim 1 wherein said detector is selected from one of ultrasonic and strain gauge detectors.

3. The system of claim 1 wherein said remote telemetry unit and said central computer are coupled via modem.

4. The system of claim 1 wherein said remote telemetry unit automatically transmits said second output signal to said central computer at predetermined time intervals.

5. The system of claim 1 wherein said central computer automatically retrieves said second output signal from said remote telemetry unit at predetermined time intervals.

6. A system for monitoring material levels in storage vessels at a remote site comprising:

a level detector for producing a first output signal corresponding to said material level, said level detector selected from one of ultrasonic and strain gauge level detectors;

a remote telemetry unit for receiving said first output signal from said level detector and producing a second output signal corresponding to said material level; and a central computer coupled to said remote telemetry unit via modem for receiving said second output signal from said remote telemetry unit, said central computer including software means for determining said material level and a projected usage rate for said material based on said second output signal, wherein said remote telemetry unit automatically transmits said second output signal to said central computer at predetermined time intervals.

7. A system for monitoring a material level in a storage vessel at a remote site comprising:

a level detector for producing a first output signal corresponding to said material level;

a means for converting said first output signal to a second ouput signal corresponding to said material level;

a central computer having software means for determining said material level and a projected usage rate for said material based on said second output signal displaying at least one of said material level and said projected usage rate; and a means for communicating said second output signal to said central computer.

8. A method for monitoring material levels in remote storage vessels and comprising the steps of:

detecting an existing material level in a remote storage vessel;

producing a first output signal corresponding to said existing material level;

producing a second output signal corresponding to said first output signal;

automatically transmitting said second output signal to a central computer at predetermined time intervals; and determining said existing material level and a projected material usage rate based on said transmitted signals.

9. The method of claim 7 further comprising the step of displaying at least one of said existing material level and said projected usage rate on said central computer.

10. The method of claim 7 further comprising the step of generating a printout of at least one of said existing material level and said projected usage rate from said central computer.

11. A system for a transportation carrier to maintain a sufficient quantity of raw materials at a remote site comprising:

a level detector for producing a first output signal corresponding to said material quantity, said level detector selected from one of ultrasonic and strain gauge level detectors;

a remote telemetry unit for receiving said first output signal from said level detector and producing a second output signal corresponding to said material level; and a central computer coupled to said remote telemetry unit via modem for receiving said second output signal from said remote telemetry unit, said central computer including software means for determining said material quantity and a projected usage rate for said material based on said second output signal, said central computer further including software means for generating at least one of audible and visual alarms if said determined material quantity is below a predetermined level, wherein said remote telemetry unit automatically transmits said second output signal to said central computer at predetermined time intervals.

12. A method for a transportation carrier to maintain sufficient quantities of raw materials at a remote manufacturing site comprising the steps of:

generating a first signal relative to an existing raw material quantity at a remote site using a detector;

automatically transmitting a second signal corresponding to said first signal, from said remote site to a central computer at predetermined time intervals;

determining said existing raw material quantity and projected material usage rate for said existing raw material quantity based on said transmitted signals;

ordering additional raw material from a preselected vendor based on said existing material quantity and said projected material usage rate;

providing a transport vehicle to deliver said additional raw material from said preselected vendor to said manufacturing site; and transporting said additional raw material from said preselected vendor to said manufacturing site, whereby additional raw material is supplied to said manufacturing site before said existing raw material is depleted.

13. The method of claim 12 further comprising the step of:

displaying at least one of said determined material quantity and said projected material usage rate on said central computer.

14. The method of claim 12 further comprising the step of:

producing at least one of audible and visual alarms, via said central computer, if said material level falls below a predetermined level.

15. The method of claim 12 wherein the step of generating a first signal relative to an existing raw material quantity at a remote site using a detector comprises using one of ultrasonic and strain gauge detectors to generate said first signal.

16. The method of claim 12 wherein said second signal is transmitted from said remote site to said central computer to said central computer via modem.

* * * * *